United States Patent
Fourcade et al.

(10) Patent No.: US 9,399,585 B2
(45) Date of Patent: Jul. 26, 2016

(54) ZIRCON COMPONENTS

(71) Applicant: Saint-Gobain Ceramics & Plastics, Inc., Worcester, MA (US)

(72) Inventors: Julien P. Fourcade, Shrewsbury, MA (US); Olivier Citti, Wellesley, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 217 days.

(21) Appl. No.: 14/338,086

(22) Filed: Jul. 22, 2014

(65) Prior Publication Data

US 2014/0334994 A1    Nov. 13, 2014

Related U.S. Application Data

(62) Division of application No. 13/310,680, filed on Dec. 2, 2011.

(60) Provisional application No. 61/419,231, filed on Dec. 2, 2010.

(51) Int. Cl.
*A47G 19/22* (2006.01)
*C01B 33/20* (2006.01)
(Continued)

(52) U.S. Cl.
CPC ............... *C01B 33/20* (2013.01); *C03B 5/1672* (2013.01); *C03B 17/04* (2013.01); *C03B 17/064* (2013.01);
(Continued)

(58) Field of Classification Search
CPC ..... C01B 33/20; Y10T 428/13; Y10T 428/26; Y10T 428/249953; Y10T 428/249961; C03B 5/1672; C03B 17/04; C03B 17/064; C22C 32/0031; C04B 41/91; C04B 35/481; C04B 35/49; C04B 41/5353; C04B 41/009; C04B 2235/3208; C04B 2235/3217; C04B 2235/3232; C04B 2235/3246; C04B 2235/3251; C04B 2235/85
USPC ................................................ 428/34.1, 34.4
See application file for complete search history.

(56) References Cited

U.S. PATENT DOCUMENTS 5,688,477 A    11/1997   Nel
6,174,509 B1    1/2001   Pavlik, Jr. et al.
(Continued)

FOREIGN PATENT DOCUMENTS

CN    101094816 A    12/2007
CN    101558023 A    10/2009
(Continued)

OTHER PUBLICATIONS

Dillon, R.P. et al. 'Dynamic Formation of Zircon during High Temperature Deformation of Zirconia-Silica Composites with Alumina Additions.' In: J. Mater. Sci., 2007, vol. 42, pp. 3537-3543.
(Continued)

*Primary Examiner* — James Yager
(74) *Attorney, Agent, or Firm* — Abel Law Group, LLP; Adam Keser (57) ABSTRACT

A zircon body for use in glass manufacturing is provided containing zircon grains and an intergranular phase present between the zircon grains. The intergranular phase may contain silicon oxide. The body may be exposed to a halide to at least partially remove at least a majority of the silicon oxide contained in the intergranular phase from the outer portion or to at least partially remove the intergranular phase along an outer portion of the component.

18 Claims, 5 Drawing Sheets

(51) Int. Cl.

| | |
|---|---|
| *C03B 5/167* | (2006.01) |
| *C03B 17/04* | (2006.01) |
| *C03B 17/06* | (2006.01) |
| *C22C 32/00* | (2006.01) |
| *C04B 41/91* | (2006.01) |
| *C04B 35/48* | (2006.01) |
| *C04B 35/49* | (2006.01) |
| *C04B 41/53* | (2006.01) |
| *C04B 41/00* | (2006.01) |

(52) U.S. Cl.
CPC ............ *C04B 35/481* (2013.01); *C04B 35/49* (2013.01); *C04B 41/009* (2013.01); *C04B 41/5353* (2013.01); *C04B 41/91* (2013.01); *C22C 32/0031* (2013.01); *C04B 2235/3208* (2013.01); *C04B 2235/3217* (2013.01); *C04B 2235/3232* (2013.01); *C04B 2235/3246* (2013.01); *C04B 2235/3251* (2013.01); *C04B 2235/3272* (2013.01); *C04B 2235/72* (2013.01); *C04B 2235/727* (2013.01); *C04B 2235/77* (2013.01); *C04B 2235/85* (2013.01); *Y10T 428/13* (2015.01); *Y10T 428/249953* (2015.04); *Y10T 428/249961* (2015.04); *Y10T 428/26* (2015.01)

(56) References Cited

U.S. PATENT DOCUMENTS

| | | |
|---|---|---|
| 6,974,786 B2 | 12/2005 | Helfinstine et al. |
| 2009/0131241 A1 | 5/2009 | Godard et al. |
| 2009/0176642 A1 | 7/2009 | Tomura et al. |
| 2010/0012484 A1 | 1/2010 | Citti et al. |
| 2010/0089098 A1 | 4/2010 | Citti et al. |

FOREIGN PATENT DOCUMENTS

| | | |
|---|---|---|
| EP | 0796226 B1 | 3/1999 |
| GB | 815245 A | 6/1959 |
| JP | 2000-505036 | 4/2000 |
| KR | 10-2004-0016825 A | 2/2004 |
| WO | 96/16903 A1 | 6/1996 |
| WO | 97/30933 A1 | 8/1997 |
| WO | 02/44102 A1 | 6/2002 |
| WO | 2006-073841 A1 | 7/2006 |

OTHER PUBLICATIONS

Ramaswamy, P. et al. 'Thermal Barrier Coating Application of Zircon Sand.' In: Therm. Spray Technol., 1999, vol. 8, pp. 447-453.

Evans, A. M. et al. 'The Influence of Quenching Rates on the Microstructure and Properties of Plasma-Dissociated Zircon.' In: J. Mater. Sci., 1979, vol. 14, pp. 680-686.

Evans, A. M. et al. 'Composition and Microstructure of Dissociated Zircon Produced in a Plasma Furnace.' In: J. Mater. Sci., 1977, vol. 12, pp. 779-790.

Wooten, A. et al. 'Wet Erosive Behaviour of Fine-Grain Zircon Ceramic.' In: J. Eur. Ceram. Soc., 1996, vol. 16, pp. 483-491.

Shi, Y. et al. 'Fabrication of Hot-Pressed Zircon Ceramics: Mechanical Properties and Microstructure.' In: Ceram. Int., 1997, vol. 23, pp. 457-462.

Aksel, C. 'The Influence of Zircon on the Mechanical Properties and Thermal Shock Behaviour of Slip-cast Alumina-Mullite Refractories.' In: Mater. Lett., 2002, vol. 57, pp. 992-997.

International Search Report for PCT/US2011/063188 dated Jun. 21, 2012, 2 pages.

ZIRCON COMPONENTS

CROSS-REFERENCE TO RELATED APPLICATION(S)

The present application is a divisional of U.S. patent application Ser. No. 13/310,680, filed Dec. 2, 2011, entitled "Zircon Components" naming Inventors Julien P. Fourcade and Olivier Citti which in turn claims priority from U.S. Provisional Patent Application Ser. No. 61/419,231 filed on Dec. 2, 2010, entitled "Zircon Components" naming Inventors Julien P. Fourcade and Olivier Citti, which are all incorporated by reference herein in their entirety.

FIELD OF THE DISCLOSURE

The present disclosure is generally directed to zircon components and methods of forming and using zircon components.

BACKGROUND

Zircon materials are used for a variety of industrial applications, some of which take advantage of high corrosion resistance properties possessed by zircon. One such application is in glass melt furnaces, where zircon also displays desirable glass contact qualities. However, further development of materials for glass melt applications continue to be demanded by the industry.

SUMMARY

According to an embodiment, a component includes a body including zircon grains, the body having an outer portion and an interior portion. Further, the body has an intergranular phase present between the zircon grains, the intergranular phase including silicon oxide, wherein $SO_{OP}<0.5SO_{IP}$, $SO_{IP}$ is the weight percent of free silicon oxide phase in the interior portion measured at a depth of 5000 microns from an outer surface, and $SO_{OP}$ is the weight percentage of the free silicon oxide phase in the outer portion, measured at a depth of 100 microns from an outer surface.

The component may have a reduced silicon oxide phase content in the outer portion, such as $SO_{OP}<0.4SO_{IP}$, $SO_{OP}<0.2SO_{IP}$, $SO_{OP}<0.1SO_{IP}$, or $SO_{OP}<0.01SO_{IP}$. Further, the $SO_{IP}$, can be within a range of 1.0 to 5.0 wt %, such as 1.5 to 4.0 wt %, 1.75 to 3.5 wt %, or 2.0 to 2.8 wt %.

The intergranular phase may be amorphous, and the silica present in the amorphous phase may be present in an amount of not less than 80 wt % silica. Alternatively, the silicon oxide present in the intergranular phase may be formed of crystallized silica. The intergranular phase present in the interior portion may have a silica content of at least 75 wt %, such as at least 80 wt %, or at least 85 wt %.

The component may be formed mainly of $ZrSiO_4$, such as not less than 90 wt % $ZrSiO_4$, not less than 95 wt % $ZrSiO_4$, not less than 97 wt %, or not less than 98 wt %. The component may be a three dimensional structure having multiple exterior portions, each terminating at an outer surface, and wherein one, multiple or all exterior portions are treated such that $SO_{OP}<0.5SO_{IP}$.

The body of the component may have certain properties: (i) an apparent porosity of less than 15%, such as within a range of 0.05 to 10.0%, or 0.1 to 10%, (ii) a density within a range of 3.84 to 4.49 g/cm³, such as 4.00 to 4.41 g/cm³, or 4.00 to 4.32 g/cm³, (iii) a modulus of rupture (MOR) of 60 to 190 MPa at room temperature, 4 point test, such as 100 to 190 MPa, or (iv) any combination thereof.

The actual form of the component can take on various geometric forms. For example, the component can be in the form of lips and mandrels (e.g., for a Danner process), bushing blocks, spouts, tubes, plungers, orifice rings, and stirrers. Typically, the component is in the form of a forming block or an isopipe.

The component may advantageously be a virgin material, not having been exposed to a glass melt for glass processing, and thereby free of glass penetrated into the pores originating from a glass melt.

The outer portion may be formed by treating the body to remove at least a majority of the silicon oxide contained in the intergranular phase, from the outer portion.

The intergranular phase may be at least partially removed from the outer portion, such that the outer portion has higher porosity than the inner portion. The difference between porosities in the interior portion and outer portion may be not less than 1 vol %, such as not less than 2 vol %, 3 vol %, 4 vol %, or not less than 5 vol %. The outer portion can be described as a 'denuded region' in which the silicon oxide rich intergranular phase is partly or almost entirely removed. Generally, at least a majority of the silicon oxide rich intergranular phase is removed.

The outer portion can extend to a depth of at least 100 microns, such as at least 200 microns, 300 microns, 500 microns, 600 microns, 700 microns, 800 microns, 900 microns, or at least 1000 microns from an outer surface.

Another embodiment is drawn to a method for treating a zircon component. One method includes providing a body containing zircon grains and an intergranular phase present between the zircon grains, the intergranular phase containing silicon oxide, and exposing the body to a halide to at least partially remove the intergranular phase along an outer portion of the component. The halide can be fluorine (F), and can be provided by introducing at least one of HF, $NH_4HF_2$, or $NH_4F$ into an aqueous solution. Here, HF is particularly useful.

The exposing step can be carried out by exposing at least a surface of the component to a fluid containing the halide, wherein exposing (i) is carried out for at least 1 hour, such as at least 5, 10, 20, or 30 hours, and (ii) the halide is provided in the fluid in the form of a halide compound, the fluid having a concentration of halide compound within a range of 0.05 to 40 vol %, such as 0.1 to 35 vol %, 0.2 to 30 vol %, 0.5 to 20 vol %, or 1 to 5 vol %. Only a portion of the component can be exposed to the halide for partial treatment, or the entirety of the component can be exposed to the halide. After exposure, the component can have an outer portion that was exposed to the halide, and an inner portion to which the halide did not penetrate, leaving the intergranular phase substantially intact.

Machining of the body can be done prior to exposing. The machining comprises (i) shape forming in which a mass of material is removed from the component to define a new shape, (ii) surface finishing, or (iii) a combination thereof.

After the component is exposed to the halide, the component may be used in the context of glass manufacture, wherein the component is exposed to a glass melt.

BRIEF DESCRIPTION OF THE DRAWINGS

The present disclosure may be better understood, and its numerous features and advantages made apparent to those skilled in the art by referencing the accompanying drawings.

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DESCRIPTION

A zircon body is provided that has an intergranular phase. Commercially available zircon bodies can be utilized, and suitable materials are disclosed in US 2010/0089098 and U.S. Pat. No. 6,974,786. The content of materials described below are in wt % unless explicitly stated otherwise. Porosity values are in vol %.

Zircon Body

The zircon body is typically a sintered product produced from a starting charge containing 75 to 99% zircon. This sintered product has desirable creep resistance and high density. In one embodiment, the composition has the following average chemical composition by weight, the percentages by weight being based on the oxides:

60% ≤ $ZrO_2$ + $HfO_2$ ≤ 75%;
27% ≤ $SiO_2$ ≤ 34%;
0% ≤ $TiO_2$;
0% ≤ $Y_2O_3$ ≤ 3.5%;
0% ≤ $Nb_2O_5$ + $Ta_2O_5$ ≤ 5%; and
Other oxides: ≤ 1.5%
for a total of 100%.

Preferably, the product according to an embodiment also has one or more of the following optional features:

$Ta_2O_5$ > 0.00%, preferably $Ta_2O_5$ ≥ 0.1%, preferably $Ta_2O_5$ ≥ 0.25%, in percentages by weight on the basis of the oxides;

$TiO_2$ < 1.5%, preferably $TiO_2$ < 1%, more preferably $TiO_2$ < 0.5%, even more preferably $TiO_2$ < 0.15% and, even more preferably still, $TiO_2$ < 0.10% in percentages by weight on the basis of the oxides. $TiO_2$ may even be an impurity;

$Nb_2O_5$ ≤ 1%, preferably $Nb_2O_5$ ≤ 0.5%, preferably $Nb_2O_5$ ≤ 0.3%, $Nb_2O_5$ ≤ 0.25%, or even $Nb_2O_5$ ≤ 0.05% in percentages by weight on the basis of the oxides;

the composition may also not contain any $Nb_2O_5$;

the total content of oxides $Nb_2O_5$ and $Ta_2O_5$, preferably the content of at least one of these oxides, and in particular the content of $Ta_2O_5$, is greater than 0.2%, greater than 0.3%, preferably greater than 0.5% and more preferably greater than 0.8%, in percentages by weight on the basis of the oxides;

the total content of the oxides $Nb_2O_5$ and $Ta_2O_5$, preferably the content of at least one of these oxides, and in particular the content of $Ta_2O_5$, is less than 4% or 3%, preferably less than 2%, preferably less than 1.7%, preferably less than 1.5% and more preferably less than 1%, in percentages by weight on the basis of the oxides;

$SiO_2$ ≥ 30%;
$ZrO_2$ + $HfO_2$ ≤ 72.9% or $ZrO_2$ + $HfO_2$ ≤ 70%;

preferably the content of "other oxides" (impurities) is less than 1.2%, preferably less than 1%, more preferably less than 0.7%, even more preferably less than 0.5% and more preferably still less than 0.2%, in percentages by weight on the basis of the oxides;

$P_2O_5$ < 1%, preferably $P_2O_5$ < 0.9%, more preferably $P_2O_5$ < 0.5%, even more preferably $P_2O_5$ < 0.3%, and even more preferably still $P_2O_5$ < 0.2%, in percentages by weight on the basis of the oxides;

$V_2O_5$ < 1%, preferably $V_2O_5$ < 0.9%, more preferably $V_2O_5$ < 0.5%, even more preferably $V_2O_5$ < 0.3%, and even more preferably still $V_2O_5$ < 0.2%, in percentages by weight on the basis of the oxides;

$Al_2O_3$ < 1%, preferably $Al_2O_3$ < 0.6%, more preferably $Al_2O_3$ < 0.4%, in weight on the basis of the oxides;

$CaO$ < 0.1%, preferably $CaO$ < 0.05%, in percentages by weight on the basis of the oxides;

$Fe_2O_3$ < 0.2%, preferably $Fe_2O_3$ < 0.08%, in percentages by weight on the basis of the oxides;

the zircon content in the starting charge is greater than or equal to 80%, preferably greater than 90%, preferably greater than 95%, as percentages by weight on the basis of the oxides;

the product of an embodiment contains more than 80% by weight of zircon ($ZrSiO_4$);

the apparent porosity is more than 0.1%, more than 2%, or more than 4%;

the apparent porosity is less than 15%, or less than 10% or even less than 8%;

the body may be in the form of a block, at least one of the dimensions of which, preferably all the dimensions of which, are greater than 100 mm. In particular, the block may be square or rectangular shaped;

In one embodiment, the zirconia in the product may be at least partially stabilized with one or more oxide of a rare earth element. The term "rare earth" or "rare earth element is intended to mean Y, Sc, La, and the Lanthanides (Ce to Lu) in the Periodic Table of the Elements. In chemical formulas, a rare earth element is represented by "RE."

In one embodiment, the zirconia content in the product is greater than 5%, preferably greater than 10%, and less than 15%, in percentages by weight on the basis of the oxides. The zirconia in the product may be at least partially stabilized with yttrium oxide, the percentage by weight of stabilized zirconia being greater than 10%, preferably greater than 20%, of the zirconia.

In one embodiment, the zirconia content in the product is less than 15% by weight on the basis of the oxides. The zirconia in the product may be at least partially stabilized with yttrium oxide, the percentage by weight of stabilized zirconia being greater than 10%, preferably greater than 20%, of the zirconia.

In one embodiment, the $Y_2O_3$ content may be greater than 0.05%, greater than 0.10%, greater than 0.15% and even greater than 0.5%, in percentages by weight on the basis of the oxides.

The yttrium oxide content $Y_2O_3$ is less than 3%, preferably less than 1.7% and more preferably less than 1%, in percentages by weight on the basis of the oxides. Advantageously, a significant modification of the crystalline phases is thus avoided, as are therefore the risks of feasibility problems associated with an increase in rigidity.

Manufacturing a sintered product may use the following steps:
- a) raw materials are mixed to form a starting charge;
- b) a green part is formed from said starting charge; and
- c) said green part is sintered so as to obtain said sintered product, said process being noteworthy in that the starting charge is determined in such a way that said product is in accordance with an embodiment.

Preferably, zircon, and optionally zirconia, is added in step a) in amounts such that the total of the zircon and zirconia contents represents at least 95% of the starting charge, as a percentage of the weight on the basis of the oxides.

In one embodiment, in step a), monoclinic zirconia, at least 1% of silica, or any combination thereof are added to the starting charge, in percentages by weight on the basis of the oxides. According to an embodiment, the starting charge contains at least 75%, preferably at least 80%, zircon.

The zircon may be provided by zircon sand (natural or synthetic, optionally milled) or else a chamotte of dense products having a high zircon content. The composition according to an embodiment, determined by chemical analysis, supplies only the overall $SiO_2$ and $ZrO_2$ contents, without distinguishing the corresponding zircon contents.

Zirconia exhibits large dilatometric variations due to its change of crystallographic state at high temperature. To limit these dilatometric variations, in particular in large blocks, it can be important to limit the zirconia content. The starting charge should therefore contain less than 25% zirconia, this being provided by having a zircon content of at least 75%.

The zirconia-containing raw materials also contain small amounts of $HfO_2$ (1.5 to 2%) and, according to the usual practice, these two oxides are not distinguished from each other.

Optional yttrium oxide, provided with the zirconia or provided separately, may also be added to the starting charge. At least 1% yttrium oxide, in percentages by weight on the basis of the oxides, may be added. However, it is desirable to limit the amount of yttrium oxide in order to avoid dissociation of the zircon at high temperature. The yttrium oxide content is therefore limited to 3.5%.

In an embodiment, no $Y_2O_3$, associated with zirconia or provided separately, is added to the starting charge. However $Y_2O_3$ may still be an impurity.

In one embodiment, the zirconia in the product is at least partially stabilized with yttrium oxide, the percentage by weight of stabilized zirconia being greater than 10% of the zirconia. For this purpose, the zirconia should be introduced in unstabilized form and the yttrium oxide should be added to the starting charge separately.

Preferably, in step a) niobium oxide, tantalum oxide, or a combination thereof, is added in amounts guaranteeing that the sintered product obtained in step c) is in accordance with an embodiment of the present application.

According to an embodiment, the sintered product optionally contains titanium oxide, niobium oxide, tantalum oxide, or any combination thereof. Addition of niobium oxide, tantalum oxide, or a combination thereof can help to sinter and improve the creep resistance of the zircon-based refractory product. Advantageously, this can also avoid having to add titanium oxide. This is because titanium oxide is known by those skilled in the art as being an additive that promotes bubbling of the zircon in very many specialty glasses. It is therefore desirable to limit the concentration of $TiO_2$.

The $SiO_2$ content of the product according to an embodiment corresponds to the $SiO_2$ content of zircon and to free silica. In one embodiment, at least 1% of silica is added to the starting charge so as to promote the onset of densification at lower temperatures than would be needed to densify pure zircon.

The "other oxides" are oxides such as $Na_2O$, $Al_2O_3$, $P_2O_5$ or $Fe_2O_3$. The contents of $Na_2O$ (which promotes the dissociation of zircon) and of $Fe_2O_3$ should be minimized. Preferably, these oxides are impurities provided by the raw materials, which oxides are not necessary constituents but are merely tolerated. At contents of less than 1.5%, it is considered that the effect of these "other oxides" does not substantially modify the result obtained.

Preferably, the content of each of the abovementioned oxides in the sintered product according to an embodiment is less than 0.5%, more preferably less than 0.3% and more preferably still less than 0.15% in percentages by weight on the basis of the oxides.

Zircon Body Treatment

Generally, the zircon body embodiments described in the previous section are composed of zircon grains and an intergranular phase is present between these zircon grains. The intergranular phase contains silicon oxide. The silicon oxide is generally present in free-form, meaning silica ($SiO_2$) that does not form part of the zircon crystal of the grains. The present inventors have found that certain characteristics of the above-described zircon body embodiments can be modified by subjecting the zircon bodies to certain treatments. As a result of such treatments, zircon components having unexpected and advantageous properties can be produced.

Following the formation of a zircon body or otherwise commercially sourcing a zircon body, the body can be optionally machined into a set of final final dimensions. Machining can include one or both of bulk material removal and surface finishing. Generally machining is carried out before further treatment. Following machining the body is cleaned.

After optionally machining and cleaning, the zircon body is exposed to a halide to at least partially remove the intergranular phase along an outer portion of the component. Generally, at least the surface of the component that will be exposed to silicon melt when used in the context of glass manufacture is exposed to the halide treatment. Treatment can be done by spraying the target surface, by soaking a portion or the entire body in the halide-containing solution, or by a combination thereof. A particular halide of choice is fluorine (F). In the case of fluorine, it may be introduced into the solution by any one of various forms, including HF, $NH_4HF_2$ or $NH_4F$, although HF may be typically used due to its efficacy and availability. Exposure of the body to the halide treatment can be carried out for a wide range of times such as from 1 hour to 30 hours, including exposure periods of at least 5 hours or at least 10 hours or at least 20 hours. Generally, the halide is in the form of a compound as noted above, and that compound is provided in solution within a range of 0.05 to 40 vol %, such as 0.1 to 35 vol %, 0.2 to 30 vol %, 0.5 to 20 vol %, or 1 to 5 vol %. Rather, it is present in the intergranular phase generally free of the zirconia component.

After exposure is completed, the body has thus formed an outer portion that was exposed to the halide, and an inner portion to which the halide did not penetrate leaving the intergranular phase substantially intact along this inner portion. After subsequent cleaning, the body can thus be utilized for glass component manufacture by exposing the body to a glass melt.

Turning to the characteristics of the thus formed component, the resulting material has an outer portion that has a reduced content phase of silicon oxide relative to the intergranular phase of the interior portion. The outer portion can have less than 50%, less than 40%, less than 20%, less than 10%, less than 1%, of the silicon oxide content in the interior portion, or even be devoid of detectable free silicon oxide.

The silicon oxide content of the reduced content phase of the outer portion and the intergranular phase of the interior portion can be determined The amount of free silica present in a sample taken from either the intergranular or reduced silicon oxide phases of the corresponding interior and exterior portions of a treated zircon body can be measured by one of the following techniques.

In a first technique, a sample is crushed and placed into a solution of HF, whereby silica and zirconium is leached into the HF solution from the crushed material. The total amounts of silica and zirconium leached are then individually determined. The portion of leached silica attributable to the zircon grains is equivalent to the amount of total leached zirconium because zirconium and silica dissociate from zircon according to the zirconium:silica stoichiometric ratio of zircon (i.e. 1:1), and the amount of free silica of the intergranular phase can be back-calculated by subtracting the total leached zirconium from the total leached silica.

Alternatively, instead of measuring the content of leached silicon oxide, the solids remaining after leaching can be dried and weighed. The amount of free silica of the intergranular phase can be calculated by subtracting the solid remains, the amount of leached zirconium, and an amount of silicon oxide stoichiometrically equivalent to the amount of leached zirconium from the weight of the original sample.

In a second technique, a surface of the sample is polished from a treated zircon component by drilling or cutting. SEM-WDS elemental mapping of Si can then be performed on a 50×50 micron square of the polished surface. From the Si map generated, the surface area of zircon grains can then be discriminated from the surface area of the silicon oxide rich intergranular phase because zircon contains approximately 32% $SiO_2$ whereas the intergranular phases have a significantly higher $SiO_2$ content. A surface percentage of silicon oxide can be measured from the Si map by using image analysis tools (e.g., VISILOG X-PERT). The weight can then be derived from the surface measurements using a density of 4.67 g/cm$^3$ for zircon and 2.6 g/cm$^3$ for the silicon oxide rich intergranular phases.

As a nondestructive alternative to testing a treated zircon body, the first and second techniques can be used on a small sample piece (25 mm×25 mm×25 mm, for example) comprising the same material as the untreated body and concurrently treated under the same conditions as the body. The first and second techniques could then be used on the sample piece to obtain useful data pertaining to the larger body without subjecting the body to core-drilling or destructive material removal techniques.

The reduced content can be quantified as $SO_{OP}<0.5 SO_{IP}$, $SO_{OP}<0.4 SO_{IP}$, such as $SO_{OP}<0.2 SO_{IP}$, or $SO_{OP}<0.1 SO_{IP}$, or $SO_{OP}<0.01 SO_{IP}$. Here, $SO_{IP}$, represents the wt % of the free silicon oxide in the intergranular phase of the interior portion at a depth of 5000 microns from an outer surface and $SO_{OP}$ is the wt % of the free silicon oxide in the outer portion measured at a depth of 100 microns. Further, $SO_{IP}$ may be within a range of 1.0 to 5.0 wt %, such as 1.5 to 4.0 wt %, 1.75 to 3.5 wt %, or 2.0 to 2.8 wt %. The foregoing measuring depths have been chosen to ensure accurate measurements of the composition of the intergranular phase in the outer (treated) and inner (untreated) portions of the body. The depths are measured according to the distance into the body along a line that is perpendicular to an outer surface of the component or if such outer surface is not planar (curved) than the line perpendicular to the tangent plane to the outer surface.

Generally, the intergranular phase of the body is amorphous or crystalline. In the case of an amorphous intergranular phase, typically the silicon oxide forms at least 80 wt % of the amorphous phase.

As described above, the body is comprised mainly of $ZrSiO_4$, such as not less than 90 wt %, not less than 95 wt %, not less than 97 wt %, or not less than 98 wt % $ZrSiO_4$. Additionally, the body can have at least one of the following properties: (i) an apparent porosity of less than 15%, such as within a range of 0.05 to 10.0%, or 0.1 to 10.0%; (ii) a density within a range of 3.84 to 4.49 g/cm$^3$, such as 4.00 to 4.41 g/cm$^3$, or 4.00 to 4.32 g/cm$^3$; (iii) MOR of 60 to 190 MPa at room temperature, 4 point test, such as 100 to 190 MPa, or (iv) any combination thereof.

In reference to the intergranular phase that remains intact in the interior portion, the intergranular phase generally contains at least 75 wt %, such as at least 80 wt %, or at least 85 wt % silica.

As noted above, the component can be in the form of a forming block, used for glass manufacture, or an isopipe, a structure known the art. The component can take a variety of other forms. For example, the component can be in the form of a lip, a mandrel, a bushing block, a spout, a tube, a plunger, an orifice rings, or a stirrer.

As a consequence of treatment, the intergranular phase along the outer portion is at least partially removed, thereby forming a higher porosity in the outer portion of the component. This higher porosity in the outer portion can be quantified, in terms of the difference in porosities between the interior and outer portions. Typically, this difference is not less than 1 vol %, such as not less than 2, 3, 4, 5, or not less than 6 vol %. Additionally, although the depth of the outer portion is dependent upon the details of the halide treatment (concentration of solution, dwell times, etc.), typically the outer portion extends to a depth of at least 100 microns, such as at least 200, 300, 500, 700, 800, 900 or at least 1000 microns.

Another embodiment of the present application relates to the use of a refractory product according to an embodiment, or one manufactured using a process according to an embodiment, in a glass furnace, in particular, in furnace zones that are in contact with molten glass.

An embodiment also relates to a glass furnace comprising a zircon component made according to one of the treatment methods embodied in the present application.

When used as components in a glass furnace, untreated zircon materials tend to demonstrate a high level of bubbling of the glass melt during initial use. This period of transient blistering is highly undesirable for glass formation. By treating a zircon body with HF according to embodiments of the present application, the period of transient blistering can be greatly reduced by a factor of 2 or more. In some cases, the period of transient blistering can be reduced by up to a factor of 10 or more.

In the present description and in accordance with the usage, "zirconia" refers to $ZrO_2$ molecules that are not associated with $SiO_2$ molecules to form zircon. Likewise, "silica" refers to $SiO_2$ molecules that are not associated with $ZrO_2$ molecules to form zircon.

The term "impurities" is understood to mean inevitable constituents, necessarily introduced with the raw materials or resulting from reactions with these constituents.

The term "free" used in connection with silicon oxide or silica as used herein refers to silicon oxide that is not crystallographically bound to zirconia in the zircon grains, rather, it is typically silicon oxide that is present in the intergranular phase, not part of the zircon grains, but which may have other species with which the free silicon oxide can form a solid solution, such as zirconia and possibly minor amounts of other species such as tantalum oxide.

Unless mentioned otherwise, all the percentages are percentages by weight on the basis of the oxides.

Many different aspects and embodiments are possible. Some of those aspects and embodiments are described herein. After reading this specification, skilled artisans will appreciate that those aspects and embodiments are only illustrative and do not limit the scope of the present invention.

Embodiments may be in accordance with any one or more of the items as listed below.

Item 1. A component comprising:
a body comprising zircon grains, the body having an outer portion and an interior portion; and
an intergranular phase present between the zircon grains, the intergranular phase comprising silicon oxide,
wherein $SO_{OP}<0.5SO_{IP}$, $SO_{IP}$ is the weight percent of free silicon oxide phase in the interior portion measured at depth of 5000 microns from an outer surface, and $SO^{OP}$ is the weight percentage of free silicon oxide phase in the outer portion, measured at a depth of 100 microns.

Item 2. The component of Item 1, wherein $SO^{OP}<0.4SO^{IP}$, such as $SO^{OP}<0.2SO_{IP}$, or $SO_{OP}<0.1SO_{IP}$, or $SO_{OP}<0.01SO_{IP}$.

Item 3. The component of Item 1, wherein the intergranular phase comprises an amorphous phase, the silicon oxide is amorphous, and the amorphous phase contains not less than 80 wt % silicon oxide.

Item 4. The component of Item 3, wherein silicon oxide present in the intergranular phase comprises crystallized silica.

Item 5. The component of Item 1, wherein $SO_{IP}$, is within a range of 1.0 to 5.0 wt %, such as 1.5 to 4.0 wt %, 1.75 to 3.5 wt %, or 2.0 to 2.8 wt %.

Item 6. The component of Item 1, wherein the body is comprised mainly of $ZrSiO_4$, such as not less than 90 wt % $ZrSiO_4$, not less than 95 wt % $ZrSiO_4$, not less than 97 wt %, or not less than 98%.

Item 7. The component of Item 1, wherein the component is a three dimensional structure having multiple exterior portions, each terminating at an outer surface, and wherein at least one of the exterior portions are treated such that $SO_{OP}<0.5SO_{IP}$.

Item 8. The component of Item 1, wherein the body has a property including:
an apparent porosity of less than 15%, such as within a range of 0.05 to 10.0%, or 0.1 to 10%;
a density within a range of 3.84 to 4.49 $g/cm^3$, such as 4.00 $g/cm^3$ to 4.41 $g/cm^3$, or 4.00 $g/cm^3$ to 4.32 $g/cm^3$;
MOR of 60 to 190 MPa at room temperature, 4 point test, such as 100 to 190 MPa; or
any combination thereof.

Item 9. The component of Item 1, wherein the intergranular phase present in the interior portion has a silica content of at least 75 wt %, such as at least 80 wt %, or at least 85 wt %.

Item 10. The component of Item 1, wherein the component is in the form of a forming block.

Item 11. The component of Item 1, wherein the component is in the form of a glass forming apparatus or the component of a glass forming apparatus.

Item 12. The component of Item 1, wherein the component is in the form of an isopipe, a lip, a mandrel, a bushing block, a spout, a tube, a plunger, an orifice ring, or a stirrer.

Item 13. The component of Item 1, wherein the outer portion is formed by treating the body to remove at least a majority of the silicon oxide contained in the intergranular phase, from the outer portion.

Item 14. The component of Item 1, wherein the component is a virgin material, not having been exposed to a glass melt for glass processing.

Item 15. The component of Item 1, wherein the intergranular phase is a least partially removed from the outer portion, such that the outer portion has higher porosity than the inner portion.

Item 16. The component of Item 1, wherein the outer portion extends to a depth of at least 100 microns, such as at least 200 microns, 300 microns, 500 microns, 600 microns, 700 microns, 800 microns, 900 microns, or at least 1000 microns.

Item 17. The component of Item 1, wherein the outer portion has higher porosity than the interior portion, such that the difference between porosities in the interior portion and outer portion is not less than 1 vol %, such as not less than 2 vol %, 3 vol %, 4 vol %, or not less than 5 vol %.

Item 18. A method for treating a zircon component comprising:
providing a body comprising zircon grains and an intergranular phase present between the zircon grains, the intergranular phase comprising silicon oxide,
exposing the body to a halide to at least partially remove the intergranular phase along an outer portion of the component.

Item 19. The method of Item 18, wherein the halide is F.

Item 20. The method of Item 19, wherein the halide is provided in solution by introducing HF, $NH_4HF_2$, $NH_4F$, or any combination thereof.

Item 21. The method of Item 20, wherein the halide is provided in solution by introducing HF.

Item 22. The method of Item 18, exposing is carried out by exposing at least a surface of the component to a fluid containing the halide, wherein exposing is carried out for at least 1 hour, such as at least 5, 10, 20, or 30 hours, and the halide is provided in the fluid in the form of a halide compound, the fluid having a concentration of halide compound within a range of 0.05 to 40 vol %, such as 0.1 to 35 vol %, 0.2 to 30 vol %, 0.5 to 20 vol %, or 1 to 5 vol %.

Item 23. The method of Item 18, wherein the silicon oxide is present as SiO2.

Item 24. The method of Item 18, wherein only a portion of the component is exposed to the halide.

Item 25. The method of Item 18, wherein an entirety of the component is exposed to the halide.

Item 26. The method of Item 20, wherein after exposure the component has an outer portion that was exposed to halide, and an inner portion to which the halide did not penetrate, leaving the intergranular phase substantially intact.

Item 27. The method of Item 18, further comprising machining the body prior to exposing.

Item 28. The method of Item 27, wherein the machining comprises shape forming in which a mass of material is removed from the component to define a new shape, surface finishing, or a combination thereof.

Item 29. The method of Item 17, wherein, after exposing the component to the halide, the component is used in a glass manufacturing process and exposed to a glass melt.

EXAMPLES

In an "isothermal" creep test, a four-point bending test configuration is used (the distance of L between the outer supports was 80 mm and the distance I between the inner supports was 40 mm). A strip measuring 8 mm×9 mm×100 mm is placed on these supports and a stress of 2 MPa is applied at the centre of the strip, the temperature being kept constant and equal to 1275°. The change in sag (in mm) of the strip over 50 hours is recorded. The mean deformation rate ($V_d$), given in mm/mm/hour, is then calculated.

The density is determined on three weighings of each specimen. A first weighing, of the dry specimen (after drying at 110° C.), gave the weight $W_{dry}$. Next, a wet specimen is prepared by taking a specimen that had been under vacuum for 30 minutes and then immersed in water so as to impregnate the accessible pore volume of the material. Weighing this wet specimen gave the weight $W_{wet}$. Finally, weighing the specimen in water gave $W_{water}$.

$W_{wet}$–$W_{water}$ provides a measure of the total volume of the specimen excluding accessible porosity. The bulk density of the material corresponds to the ratio of the $W_{dry}/(W_{wet}-W_{water})$.

The apparent porosity is deduced from these measurements considering that the difference $W_{wet}$–$W_{dry}$ corresponds to the volume of the open porosity infiltrated with water. The ratio $W_{wet}$–$W_{dry}/(W_{wet}$–$W_{water})*100$ gives the apparent porosity proportion.

The average chemical composition of the various products treated in the following examples, and the results of characterization tests of those products, are given in Table 1 (the percentages by weight being on the basis of the oxides). Products 1 through 6 correspond to conventional formulations or zircon materials before treatment with a halide. The content of minor oxides, such as $P_2O_5$, $Fe_2O_3$, etc., is not given in the table. The total content of minor oxides is less than 1%.

TABLE 1

| No. | $ZrO_2$ + $HfO_2$ (%) | $SiO_2$ (%) | $TiO_2$ (%) | $Al_2O_3$ (%) | Additive | Additive (%) | $V_d$ (1275° C.) | Density (g/cm³) |
|---|---|---|---|---|---|---|---|---|
| 1 | 64.7 | 32.4 | 0.15 | 0.38 | $TiO_2$ | 0.45 | $4.5 \times 10^{-5}$ | 4.28 |
| 2 | 65 | 33 | 0.15 | 0.30 | $TiO_2$ | 0.2 | $3.2 \times 10^{-5}$ | 4.17 |
| 3 | 64.5 | 32.4 | 0.08 | 0.41 | $Ta_2O_5$ | 0.92 | $4.5 \times 10^{-6}$ | 4.13 |
| 4 | 65.9 | 32.4 | 0.11 | 0.38 | $Ta_2O_5$ | 0.95 | / | 4.20 |
| 5 | 65.9 | 32.4 | / | 0.38 | $Ta_2O_5$ | 0.8 | $4.1 \times 10^{-6}$ | 4.26 |
| 6 | 65.9 | 32.4 | / | 0.35 | $Ta_2O_5$ | 0.95 | $4.4 \times 10^{-6}$ | 4.32 |

The examples show that the addition of $TiO_2$ or $Ta_2O_5$ makes it possible for the creep deformation to be very significantly reduced.

Moreover, it has also been found that the presence of $Ta_2O_5$ advantageously makes it unnecessary to add titanium oxide in order to obtain sufficient densification. This is because the density of the products of an embodiment is equivalent to or greater than that of the reference product.

Referring to Table 1, the best compromises between resistance to creep deformation and high density were obtained with $Ta_2O_5$ contents higher than 0.9%.

In the following examples, samples of zircon corresponding to materials 1 through 6 of Table 1 were subjected to halide treatment in accordance with embodiments of the present invention.

In Example 1-12, 12 zircon samples corresponding to material number 4 of Table 1 were subjected to 4 HF treatments over a period of 17 days. The four HF solutions had concentrations of a 1% sol, a 0.5% sol, a 0.2% sol, and a 0.1% sol.

Figure 1:
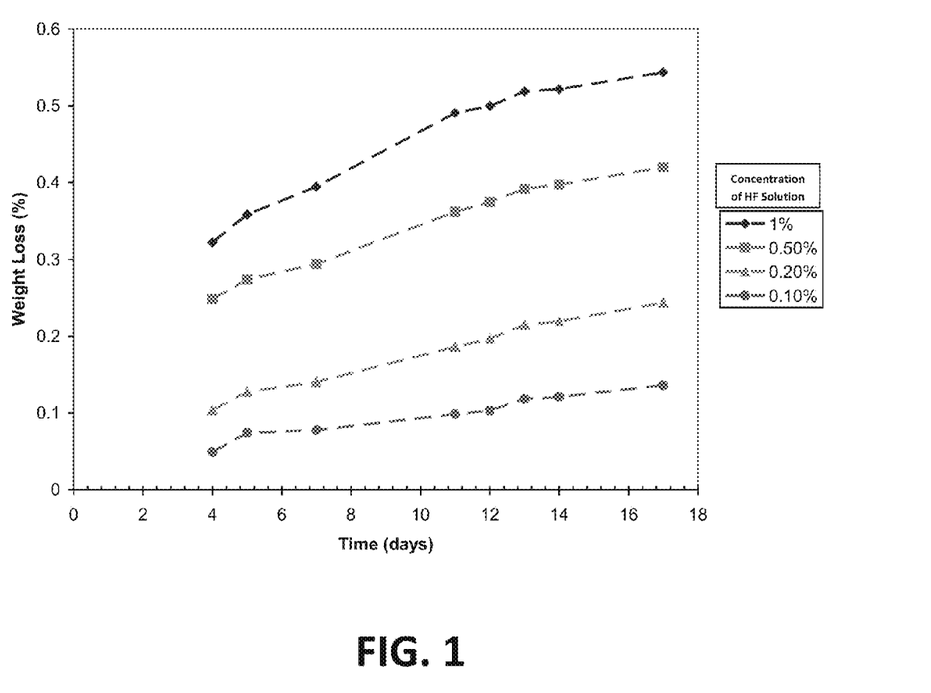
FIG. 1 includes four plots of weight loss versus time for four zircon bodies, each zircon body being treated with an acid in accordance with an embodiment. The concentrations of all four acids are different.
Figure 2:
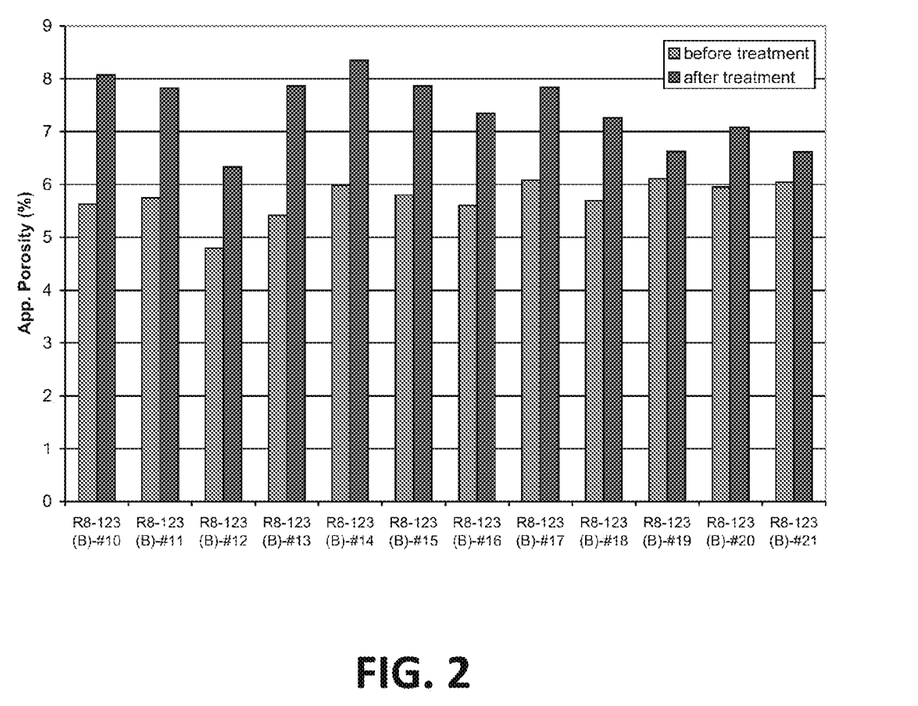
FIG. 2 includes a bar graph displaying the apparent porosity of 12 zircon bodies before and after a treatment in accordance with an embodiment.

One sample for each of the 4 HF treatments was removed from the HF solution daily so that measurements could be taken with respect to the passage of time. The other two samples remained in solution for the duration. FIG. 1 illustrates the relationship between the strength of the HF solution and weight loss the samples due to depletion of silicon oxide from the outer portion of the sample over time. FIG. 2 illustrates the relationship between the strength of the HF treatment and percent change in the apparent porosity over the 17 day period. Reviewing the bar graphs of FIG. 2 from left to right, the first two of every three pairs of before-and-after bar graphs represent the samples that were not removed from solution over time.

Figure 3:
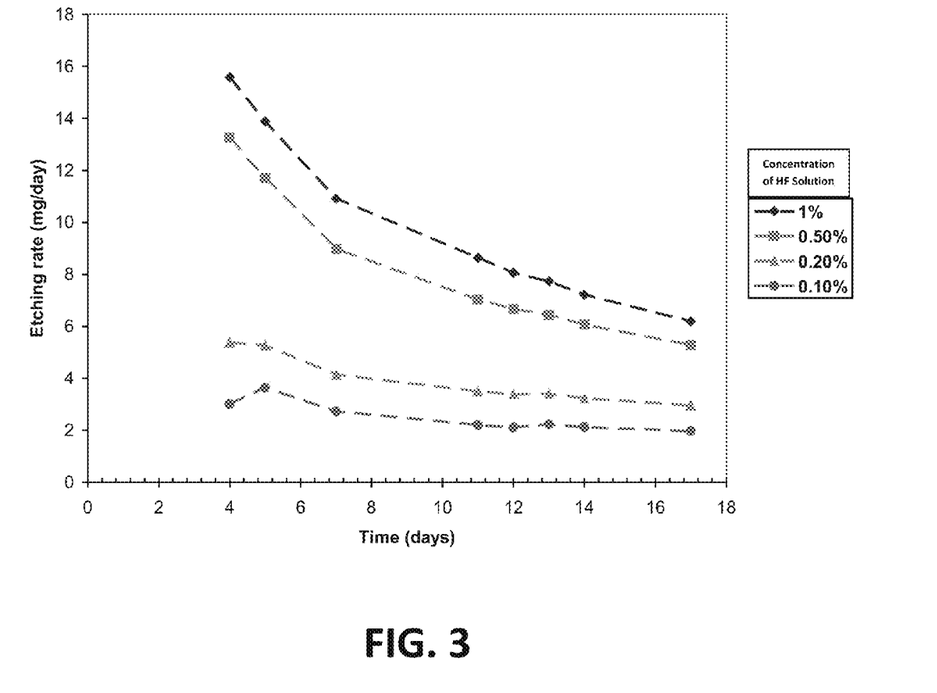
FIG. 3 includes four plots of the etching rate versus time for four zircon bodies each zircon body being treated with an acid in accordance with an embodiment. The concentrations of all four acids are different.

FIG. 3 illustrates the relationship between the strength of the HF solution and the rate at which the HF solution etches the silicon oxide from the outer portion of the samples as a function of time.

Figure 4:
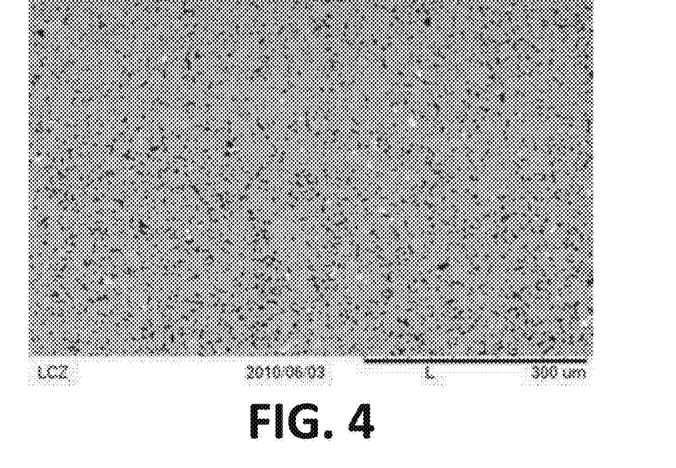
FIG. 4 illustrates the typical microstructure of zircon material before a treatment with HF in accordance with an embodiment.
Figure 5:
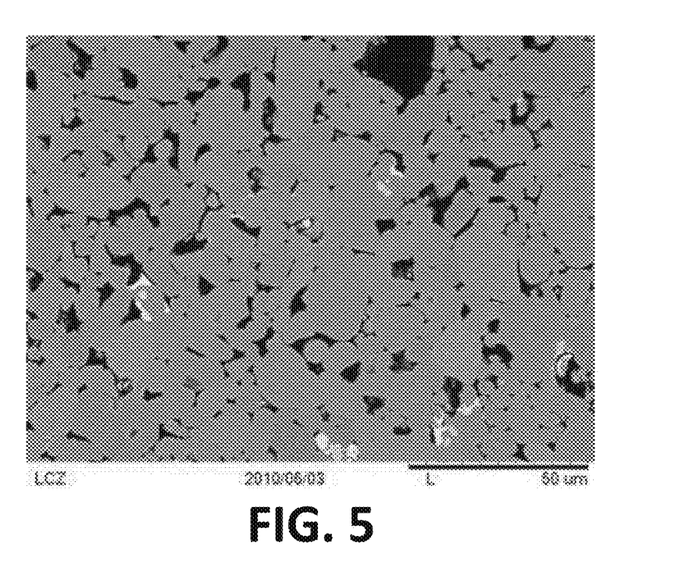
FIG. 5 illustrates the microstructure of a zircon sample after an HF treatment in accordance with an embodiment.

Example 13, illustrated by FIGS. 4 and 5, demonstrates the effect of the HF solution on the microstructure of the outer portion of a zircon component. In FIG. 4, the microstructure of an untreated sample corresponding to material number 4 is shown. In FIG. 5, the microstructure of a zircon sample after an HF treatment according to an embodiment of the present application is shown. From a comparison of the sample of FIG. 4 and the sample of FIG. 5, it is clear that the HF treatment increases the porosity of the outer portion of the zircon sample components.

Figure 6:
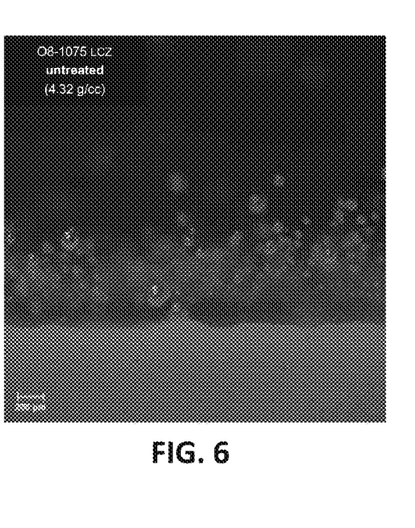
FIG. 6 illustrates the transient blistering of an untreated zircon body maintained at elevated temperature over a period of time.
Figure 7:
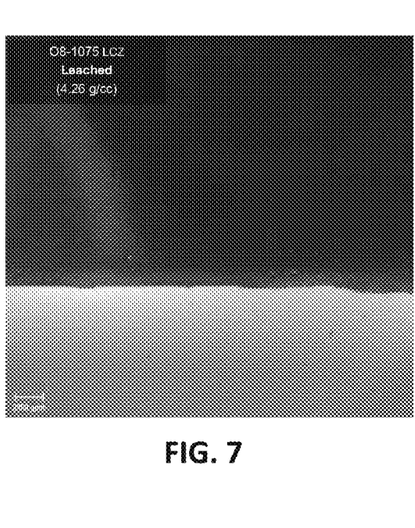
FIG. 7 illustrates a zircon body treated according to an embodiment and subsequently maintained under the same conditions as the zircon body illustrated in FIG. 6.

In Example 14, a sample corresponding to material number 6 treated with a 20% HF sol for 72 hours was heated at 1250° C. for 72 hours in a sample of LCD glass. A photo of the sample after heating is shown in FIG. 7. In Example 15, an untreated sample, identical to the sample of Example 14 before treatment, is subjected to the same heating conditions. A photo of the sample after the heat treatment is shown in FIG. 6. FIG. 6 clearly shows significant bubbling of the glass near the surface of zircon component, whereas FIG. 7 shows little or no bubbling.

Results similar to those observed in Examples 13 and 14 were also obtained for samples corresponding to numbers 1-3 and 5-6 under similar conditions. That is, significantly reduced bubbling was observed in the treated samples compared to the untreated samples after heat treatment.

Reduction of transient blistering is a particularly advantageous characteristic in zircon materials. For example, this reduced transient blistering is useful in the context using zircon components in glass furnaces. The initial use of a glass furnace comprising zircon materials is typically accompanied by a transient blistering period. During startup of the manufacturing process, the first glass articles leaving the forming apparatus blister as they touch the virgin surface of the refractory for the first time. Depending on the application, transient blistering can last from a couple of days to several weeks. During the transient blistering period, most of the production must be rejected, which incurs significant business losses.

Accordingly, it would be desirable to reduce or eliminate the length of the transient blistering period.

After treatment, the apparent porosity of samples treated in the 1% sol and the 0.5% sol were found to have increased by approximately 2%, the sample treated in the 0.2% sol increased by approximately 1.6%, and the sample treated in the 0.1% sol increased by approximately 0.6%.

A zircon body was submerged in a bath of HF solution for 24 hours. Different solutions were chosen for various samples, including a 25% sol, a 5% sol and a $NH_4F$ solution. The samples were removed from the tank, cleaned, and dried.

In use, it was found that treated components having the above-described outer portion that is at least partially depleted of free silicon oxide, showed markedly enhanced performance. In use, untreated zircon components tend to demonstrate a high level of bubbling of the glass melt, which is highly undesirable for glass formation. In contrast, treated examples were found to have virtually no bubbling, or notably reduced bubbling. It is believed that the marked reduction in free silica in the outer portion, which tends to come in contact with the glass melt, is responsible for the reduced bubbling and or blistering within the glass melt.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises", "comprising", "includes", "including", "has", "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for treating a zircon component comprising:
providing a body comprising zircon grains the body having an outer portion and an interior portion, and an intergranular phase present between the zircon grains, the intergranular phase comprising silicon oxide,
exposing the body to a halide to at least partially remove the intergranular phase along an outer portion of the component, wherein, after exposing the body to a halide, the component has the outer portion that was exposed to a halide, and an interior portion to which the halide did not penetrate, leaving the intergranular phase substantially intact and after exposing the body to the halide, $SO_{OP} < 0.50 SO_{IP}$, wherein $SO_{IP}$ is the weight percent of free silicon oxide phase in the interior portion measured at a depth of 5000 microns from an outer surface, and $SO_{OP}$ is the weight percentage of free silicon oxide phase in the outer portion, measured at a depth of 100 microns.

2. The method of claim 1, wherein the halide is F.

3. The method of claim 1, wherein the silicon oxide is $SiO_2$.

4. The method of claim 1, wherein the halide is provided in solution by introducing HF, $NH_4HF_2$, $NH_4F$, or any combination thereof.

5. The method of claim 1, wherein the halide is provided in solution by introducing HF.

6. The method of claim 1, wherein only a portion of the component is exposed to the halide.

7. The method of claim 1, wherein exposing the body to a halide is carried out by exposing at least a surface of the component to a fluid containing the halide.

8. The method of claim 7, wherein exposing the body to a halide is carried out for at least 1 hour.

9. The method of claim 7, wherein the halide is provided in the fluid in the form of a halide compound, the fluid having a concentration of halide compound within a range of 0.05 to 40 vol %.

10. The method of claim 1, further comprising machining the body prior to exposing.

11. The method of claim 10, wherein the machining comprises shape forming in which a mass of material is removed from the component to define a new shape, surface finishing, or a combination thereof.

12. The method of claim 1, wherein, after exposing the body to the halide, the component is used in a glass manufacturing process and exposed to a glass melt.

13. The method of claim 1, wherein $SO_{IP}$ is within a range of 1.0 to 5.0 wt %.

14. The method of claim 1, wherein the intergranular phase present in the interior portion has a silica content of at least 75 wt %.

15. The method of claim 1, wherein the component is in the form of an isopipe, a lip, a mandrel, a bushing block, a spout, a tube, a plunger, an orifice ring, or a stirrer.

16. The method of claim 1, wherein, after exposing the body to the halide, the outer portion has higher porosity than the interior portion.

17. The method of claim 16, wherein the difference between porosities in the interior portion and outer portion is not less than 1 vol %.

18. The method of claim 10, wherein, after exposing the component to the halide, the body has a property including:

an apparent porosity of less than 15%;
a density within a range of 3.84 to 4.49 g/cm$^3$;
an MOR of 60 to 190 MPa at room temperature, 4 point test; or
any combination thereof.

* * * * *